(12) United States Patent
Mahan et al.

(10) Patent No.: US 10,854,120 B2
(45) Date of Patent: Dec. 1, 2020

(54) APPARATUS AND METHOD FOR PROVIDING A MARKETING DISPLAY ON CHILDREN'S PRODUCTS

(71) Applicant: GRACO CHILDREN'S PRODUCTS, INC., Atlanta, GA (US)

(72) Inventors: Kristen Mahan, Atlanta, GA (US); Laura Holman, Atlanta, GA (US); Jessica Kattula, Atlanta, GA (US)

(73) Assignee: GRACO CHILDREN'S PRODUCTS, INC., Atlanta, GA (US)

( * ) Notice: Subject to any disclaimer, the term of this patent is extended or adjusted under 35 U.S.C. 154(b) by 0 days.

(21) Appl. No.: 16/437,318

(22) Filed: Jun. 11, 2019

(65) Prior Publication Data
US 2019/0311659 A1    Oct. 10, 2019

Related U.S. Application Data

(60) Provisional application No. 62/683,171, filed on Jun. 11, 2018.

(51) Int. Cl.
| | | |
|---|---|---|
| G09F 15/00 | (2006.01) | |
| A47D 13/06 | (2006.01) | |
| G09F 23/02 | (2006.01) | |

(52) U.S. Cl.
CPC ....... *G09F 15/0018* (2013.01); *A47D 13/066* (2013.01); *G09F 23/02* (2013.01); *G09F 2015/0093* (2013.01)

(58) Field of Classification Search
CPC ......... G09F 15/0025; G09F 2015/0093; A47D 13/063
See application file for complete search history.

(56) References Cited

U.S. PATENT DOCUMENTS

| | | | | |
|---|---|---|---|---|
| 2,461,682 | A * | 2/1949 | De Ferrari | A63H 33/006 482/130 |
| 4,008,497 | A * | 2/1977 | Badon | E04H 4/065 4/487 |
| 4,601,120 | A * | 7/1986 | Levin | A45B 3/04 40/317 |
| 4,962,779 | A * | 10/1990 | Meng | A45B 3/00 135/16 |
| 5,649,390 | A * | 7/1997 | Davidson | B44C 5/00 160/179 |

(Continued)

*Primary Examiner* — Gary C Hoge
(74) *Attorney, Agent, or Firm* — Eversheds Sutherland (US) LLP

(57) ABSTRACT

A children's product, such as a playard, can be adjustable from a collapsed configuration to an expanded or use configuration. Marketing displays may be beneficial for selling children's product. These marketing displays may be integrally formed or fixedly coupled to the children's product prior to shipment to the retailer to assist the retailer in marketing the product. The marketing display can be made from materials that resist wrinkling so that the marketing display can be collapsed and shipped with the children's product and then expanded and displayed at the retailer. By integrally forming or fixedly coupling the marketing display into the children's product, the display will not be lost, adding the display to the product will not be forgotten, and/or the display will be properly positioned when the product is adjusted to the expanded configuration.

18 Claims, 5 Drawing Sheets

(56) References Cited

U.S. PATENT DOCUMENTS

| | | | | |
|---|---|---|---|---|
| 6,168,495 B1* | 1/2001 | Yoon | ............... | A63H 33/008 |
| | | | | 446/476 |
| 6,301,731 B1* | 10/2001 | Jakubowski | ............ | A47D 13/06 |
| | | | | 446/227 |
| 9,299,272 B2 | 3/2016 | Stephanopoulos | | |
| 2006/0174525 A1* | 8/2006 | Hughes | ............... | G09F 15/0025 |
| | | | | 40/603 |
| 2006/0185082 A1* | 8/2006 | Casati Troutman | ......................... | |
| | | | | A47D 13/063 |
| | | | | 5/99.1 |
| 2007/0125409 A1* | 6/2007 | Cullen | ................. | A45B 15/00 |
| | | | | 135/33.41 |
| 2011/0067279 A1* | 3/2011 | Dos Santos Camacho | ................ | |
| | | | | G09F 7/22 |
| | | | | 40/601 |
| 2012/0073170 A1* | 3/2012 | Boltz | ................. | G09F 15/0025 |
| | | | | 40/603 |
| 2016/0133167 A1* | 5/2016 | Stephanopoulos | ......................... | |
| | | | | G09F 15/0025 |
| | | | | 40/603 |

\* cited by examiner

APPARATUS AND METHOD FOR PROVIDING A MARKETING DISPLAY ON CHILDREN'S PRODUCTS

RELATED APPLICATIONS

This application claims priority under 35 U.S.C. § 119 to U.S. Provisional Patent Application No. 62/683,171 filed Jun. 11, 2018, and titled "APPARATUS AND METHOD FOR A FOLDABLE PLAYARD WITH DISPLAY," the entire contents of which are hereby incorporated herein by reference for all purposes.

TECHNICAL FIELD

Embodiments disclosed herein are generally related to marketing displays, such as point-of-purchase displays, and more particularly to apparatuses and methods for providing point-of-purchase displays on infant and children's products.

BACKGROUND

Certain infant and children's products (hereinafter "children's products"), such as playards, strollers, and other child containment systems, can be configured to be folded for storage and unfolded for use. In certain circumstances, retailers may desire to display these products in an open configuration in an effort to promote or otherwise drive sales of the playard, stroller, or other child containment system. As part of this display, it can be beneficial to include a point-of-purchase marketing display that optionally provides the name of the manufacturer, the name of the children's product, describes the children's product and its features, provides illustrations of the children's product in use, provides a listing of any use restrictions, and/or provides pricing or discount information for the children's product. This information may be provided in written and/or picture format on the point-of-purchase marketing display.

However, conventional children's products, including but not limited to playards, strollers, and other child containment systems, typically do not include point of purchasing advertising displays included with or on the children's product. One reason for this is that most conventional point-of-purchase marketing displays are made of cardboard or paper. To include them with the children's product that is typically folded or fully or partially disassembled and placed within packaging, such as a cardboard container, prior to transport and then shipped in to the folded or disassembled configuration, and which then must be unfolded and/or assembled prior to displaying by the retailer, would require the point-of-purchase marketing display to be folded up with the children's product for shipping, resulting in an advertising display that is wrinkled, deformed, or worse. Instead, the point of purchasing advertising display must be sent separately and then placed on the playard by an employee of the retailer. This can result in advertising that is poorly attached to the children's product, attached to the wrong product, or attached in such a way that it does not appear neat and well-kept. In addition, in some situations, the retailer may fail to remember to attach or otherwise include the advertising display with the playard once it is removed from its box and unfolded and/or assembled into the use configuration.

BRIEF DESCRIPTION OF THE SEVERAL VIEWS OF THE DRAWINGS

For a more complete understanding of the present disclosure and certain features thereof, reference is now made to the following description, in conjunction with the accompanying figures briefly described as follows.

DETAILED DESCRIPTION OF THE EXAMPLE EMBODIMENTS

Figure 1A:
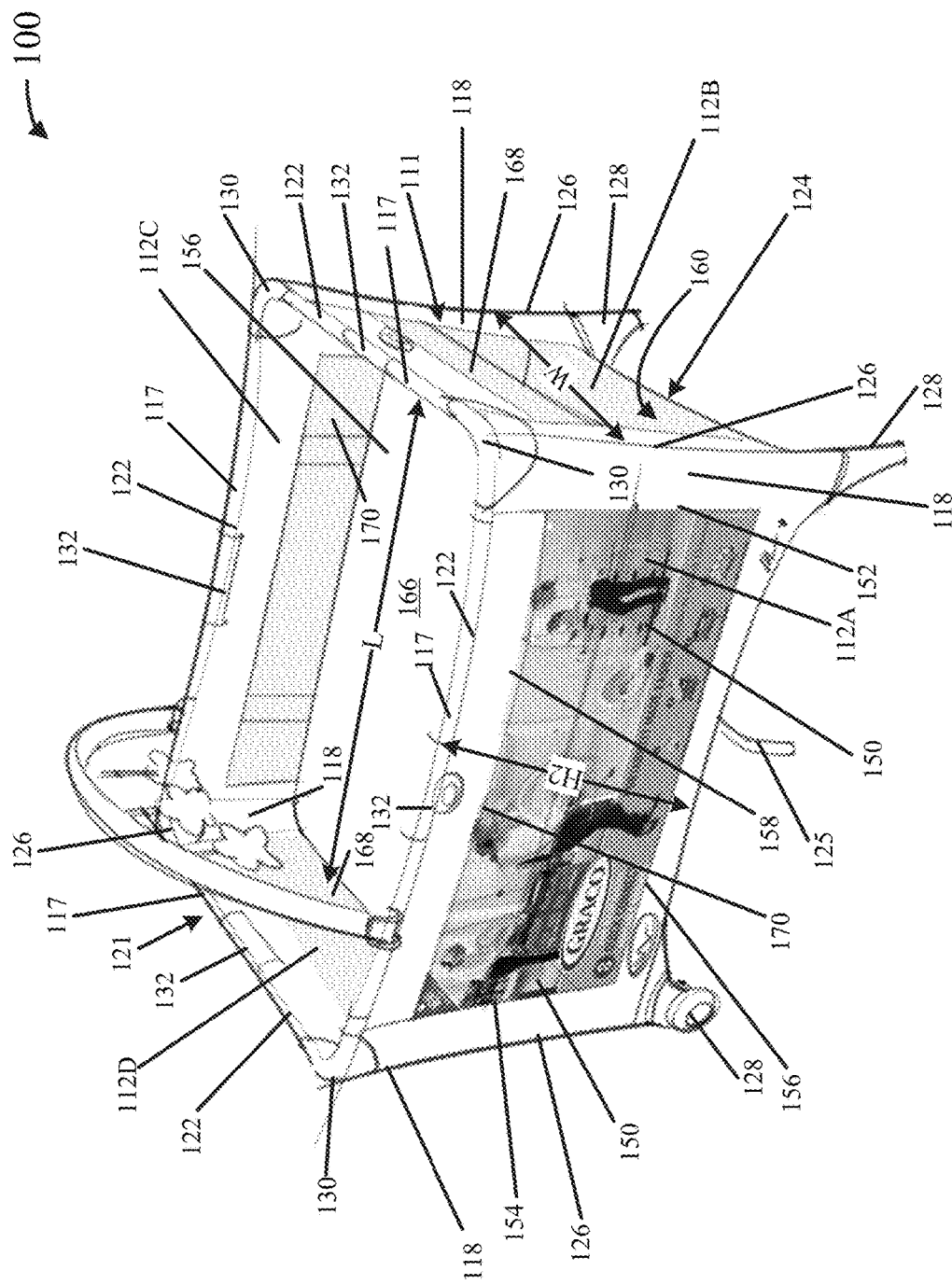
FIGS. 1A and 1B present perspective and side elevation views of a children's product, in this example a playard, in the expanded (e.g., unfolded, use) configuration that includes a point-of-purchase marketing display integrated into the children's product, in accordance with one example embodiment of the disclosure.

Example embodiments now will be described more fully hereinafter with reference to the accompanying drawings, in which example embodiments are shown. This invention may, however, be embodied in many different forms and should not be construed as limited to the example embodiments set forth herein; rather, these embodiments are provided so that this disclosure will be thorough and complete, and will fully convey the scope and spirit of that which is claimed to those of ordinary skill in the art. Like numbers refer to like, but not necessarily the same, elements throughout.

Certain dimensions and features of the example children's products and point-of-purchase marketing displays are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom.

Children's products, such as playards, strollers, and other child containment systems can include a frame structure supporting fabric or other soft goods. With regard to playards, the frame structure and supporting fabric or other soft goods can define an enclosure having a play or sleeping surface at the bottom of the enclosure. The side walls of a playard can be rather tall to contain an infant or toddler within the playard as the child sleeps or plays. A toddler can stand up so that a caregiver can grasp and lift the child out of the playard without having to reach over the side walls all the way down to the bottom surface.

For infants, using the standard playard bottom surface for a napping or sleeping apparatus can be less convenient because the infant cannot stand up for removal. Consequently, a sleeping device for infants can also be configured in the form of a bassinet that can be removably attached to the playard. In one example, the bassinet can be suspended from the top rails of a playard frame structure above the playard's bottom surface. This type of bassinet can be a rectangular box shape and can include an infant support surface and multiple side walls surrounding and extending up from the infant support surface to define a bassinet cavity. One example of this type of bassinet can have multiple elongated hooks or clips positioned adjacent the top of the side walls. The hooks or clips can have an inverted U-shape cross-section that is hooked onto and hangs from one or more of the top rails of the playard frame structure. The box-shaped bassinet bed then hangs from the clips.

In some embodiments, the playard can also include a changing table device that can be fixedly, rotatably, or removably coupled to one or more of the top rails of the playard frame or the bassinet. Alternatively, the changing table can be configured to rest on the infant support surface of the bassinet. The changing table device can be configured to provide an area for diaper changing of an infant or toddler.

The playard can also include an infant support unit that includes a frame and soft goods positioned along and/or about at least a portion of the frame. At least a portion of the soft goods and the frame can define a sleeping area or bed for the infant. The infant support unit, or a portion thereof, can be configured to be positioned at least partially within a cavity defined by the infant support surface and the side walls. The infant support unit can be coupled to one or more of the top rails of the playard frame, the bassinet, and/or configured to rest on the infant support surface of the bassinet.

The disclosed children's products, including but not limited to playards, strollers, and other child containment systems, can be generally capable of being adjusted from a collapsed (e.g., folded, stored) configuration to an expanded (e.g., unfolded, use) configuration and back again as needed. Further, the example children's products can be generally capable of reconfiguration into multiple operational modes or orientations. For example, the playard can be reconfigured to include or not include a bassinet and/or changing table. The disclosed systems generally include a playard, a bassinet, changing table, and/or a removable infant support unit. The operational modes or orientations of the playard generally involve either coupling one or more infant support units, changing tables, bassinets, or products to the playard or bassinet.

Further, the example stroller can be reconfigured to have one child seat, two child seats, one child seat and one child ride-along step, one child seat and one infant carrier, etc. The disclosed children's products may have operational modes or system configurations beyond those involving those discussed.

Figure 1B:
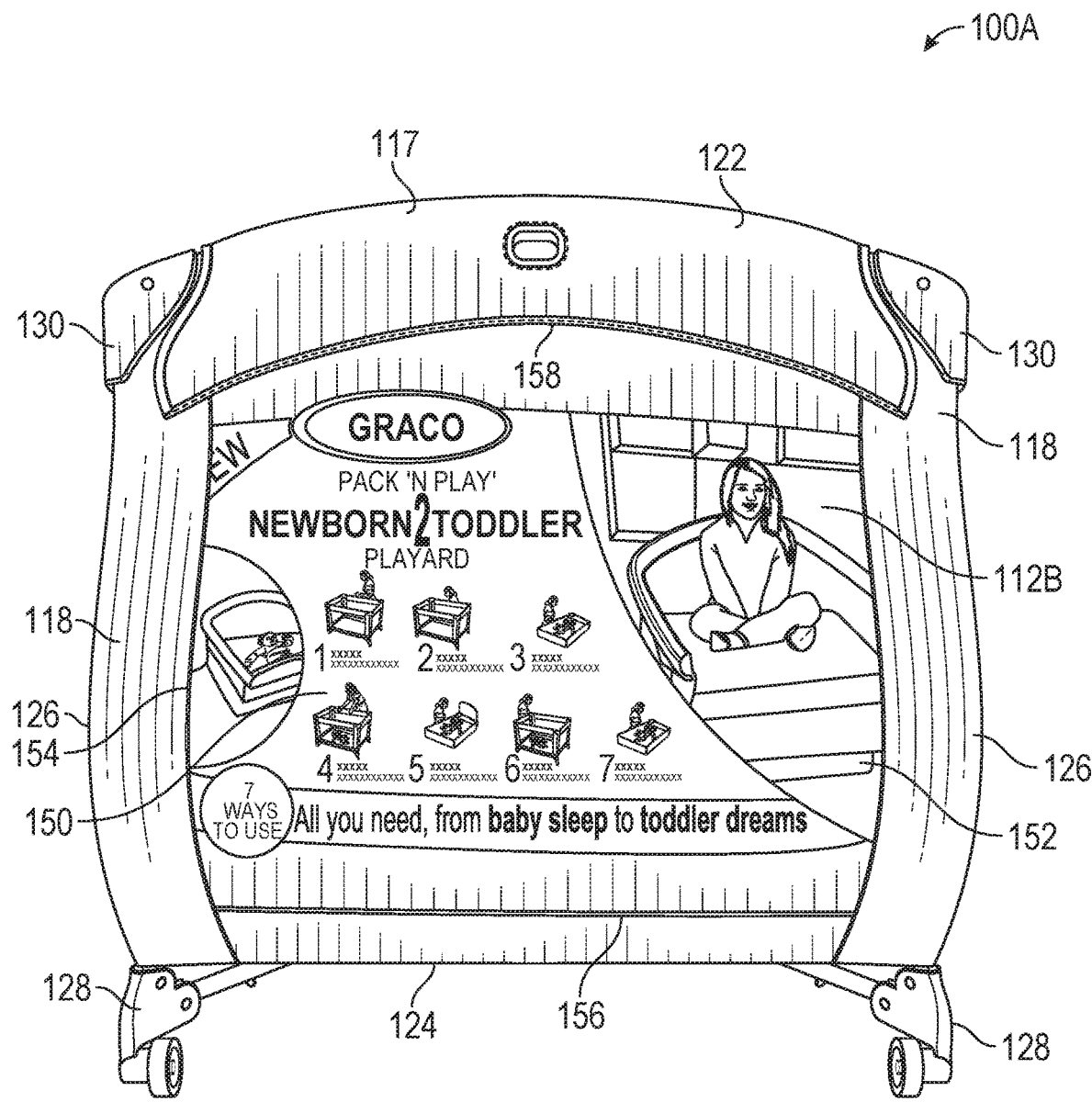

FIGS. 1A and 1B present perspective and side elevation views of a children's product, in this example a playard 100, in the expanded (e.g., unfolded, use) configuration that includes a point-of-purchase marketing display integrated into the children's product, in accordance with one example embodiment of the disclosure. While the example embodiment of FIGS. 1A and 1B will be described with reference to a playard 100, this is for example purposes only as the concepts described herein may be easily applied to other children's products, including but not limited to strollers and other child containment systems.

Referring now to FIGS. 1A and 1B, the playard 100 can include one or more flexible side panels 111. In one example, the flexible side panel 111 can include four side panel portions 112 (112A, 112B, 112C, 112D, which can be referred to individually or collectively as the side panel portions 112), each side panel portion 112 forming one of the sides of a four-sided playard. In one example, the side panel portions 112A, 112B, 112C, 112D can be integrally formed as a single side wall panel. In other example embodiments, each side panel portion 112A, 112B, 112C, 112D can be joined together by vertically extending outer corner panels 118. While the example embodiment of FIG. 1A shows four side panel portions 112A, 112B, 112C, 112D, in other example embodiments, the playard 100 can include anywhere between one (e.g., circular or oval) to ten side panel portions depending on the number of sides provided on the playard, which can also be anywhere between 1-10 sides.

In one example, each side panel portion 112A, 112B, 112C, 112D, or a portion thereof can be made of soft goods and can include at least a portion that is flexible. These flexible side panel portions 112A, 112B, 112C, 112D (or the area at which the side panel portions are coupled to another side panel portion) can hug the vertically extending corner posts 126 of the playard 100 that extend up from each leg or wheel 128 at the outer panels 118, so that adjacent side panel portions 112A, 112B, 112C, or 112D extend at an angle relative to each other to form a corner or radiused edge of the playard 100. For a square or rectangular-shaped playard, each side panel portion 112A, 112B, 112C, 112D can extend at an angle of about 90 degrees relative to the adjacent side panel portions. Other angles can be created at the transition from one side panel portion to another side panel portion based on the particular shape and number of sides provided for the playard 100.

In addition, one or more of the side panel portions 112A, 112B, 112C, 112D, can include at least a portion that is fully or partially see-through. Further, one or more of the side panel portions 112A, 112B, 112C, 112D can include another portion that is not see through or is opaque. In one example, the see-through portion of each side panel portion 112A, 112B, 112C, 112D is surrounded or bordered along one or more sides by the opaque portion of that side panel portion. Each side panel portion 112A, 112B, 112C, 112D can be made of soft goods, such as leather, pleather, fabric, plastic, mesh material, netting, padding, or other forms of soft goods. In one example, the mesh or netting is fully or partially see-through, enhances ventilation through the playard, and allows the child to see and to be seen from outside of the playard 100.

The side panel portions 112A, 112B, 112C, 112D can be generally attached together to form the flexible side panel 111. For example, each of the side panel portions 112A, 112B, 112C, 112D can be sewn together or coupled in another fashion. Each of the side panel portions 112A, 112B, 112C, 112D can also include a laterally extending tubular sleeve 117 to facilitate mounting of the side panel 111 to one or more respective upper support rail members of the playard frame, as will be described below.

The playard 100 can also include a flexible bottom panel 160 that is attached to the lower edge of each of the side panels 112A, 112B, 112C, 112D. In one example embodiment, the flexible bottom panel 160 can be sewn to the side panels 112 or formed from the same piece of material as the side panels 112. The playard 100 also can include a removable mattress or padded panel member (not shown) that can be positioned above and rest on the bottom panel 160. The mattress or padded member can include a foam cushion enclosed in a layer or layers of fabric or plastic material, such as nylon, that form a pad cover. The mattress or padded panel member typically can be partitioned into two or more sections (e.g., four sections), each containing one of four rigid stiffening platforms.

The playard 100 can also include four inner corner panels or four vertically extending tubular sleeves (not shown), which are attached to the inner sides of adjacent side panel portions 112 or which are configured to receive the vertically extending corner posts 126. In example embodiments with corner panels, the corner panel can be attached to the inner sides of adjacent side panel portions 112A and 112B, 112B and 112C, 112C and 112D, and/or 112D and 112A. A corner panel can be attached to the inner surfaces of adjacent side panel portions 112A and 112B, 112B and 112C, 112C and 112D, and/or 112D and 112A at each corner area of the playard 100 so that the corner panel is spaced from and covers or hides the respective corner post 126 of the playard 100. The corner panel can be made of a flexible sheet material and can be stretched so that it remains taut between the adjacent side panel portions 112A and 112B, 112B and 112C, 112C and 112D, and/or 112D and 112A. The corner panel, or alternatively, the vertically extending tubular sleeve, effectively isolates the corner post 126 extending up from the respective leg or wheel 128 from an interior space of the playard 100 defined by the playard bottom panel 160 and the side panel portions 112A, 112B, 112C, 112D so that a child playing in the playard 100 cannot accidentally come into contact with the corner post 126 and/or the leg or wheel 128, which forms part of the rigid frame of the playard 100.

A frame structure of the playard 100 can include an upper support assembly 121, a lower support assembly 124, and corner posts 126. The lower support assembly 124 can include rigid corner leg connectors at or adjacent the bottom end of each respective corner post 126 to couple and/or rotatably couple at least a portion of the lower support assembly 124 to the respective corner post 126. The upper support assembly 121 can include rigid corner rail connectors or corner brackets 130 at or adjacent to the top end of each respective corner post 126 to couple and/or rotatably couple at least a portion of the upper support assembly 121 to the respective corner post 126.

In one example, the corner brackets 130 and rigid corner leg connectors can be made of metal, plastic, or an alloy, In one example, each corner bracket 130 and rigid corner leg connector can be molded from a polymeric plastic material such as ABS.

The upper support assembly 121 includes at least four upper support rail members 122, one for each side of the playard 100. Each upper support rail member 122 can include one or two elongated members, such as solid or tubular rails. In one example, each side of the playard 100 includes two elongated members (e.g., solid or tubular rails). In this example embodiment, all four upper support rails can be adjusted from a expanded (e.g., unfolded, use) configuration to a collapsed (e.g., folded, stored) configuration and vice-versa.

In another example embodiment, two opposing sides of the upper support assembly 121 include two elongated members (e.g., solid or tubular rails), while the other two opposing sides include one elongated member (e.g., solid or tubular rail). In this example embodiment, the two opposing sides with two elongated members (e.g., the two longer sides of the playard 100) can be foldable from an expanded (e.g., unfolded, use) configuration to a collapsed (e.g., folded, stored) configuration and vice-versa, while the other two opposing sides (e.g., the two shorter sides of the playard 100) may remain laterally disposed as the playard or other children's product is adjusted from the expanded (e.g., unfolded, use) configuration to the collapsed (e.g., folded, stored) configuration and back again.

In one example, each upper support rail member 122 in the expanded (e.g., unfolded, use) configuration can be linear or substantially linear, as shown in FIG. 1A, to create a straight or substantially straight upper rail member. Alternatively, one or more of the upper support rail members 122 can be curved to create a curved upper rail member. In certain example embodiments, end portions of the upper support rail members 122 are received in and pivotally connected to a respective corner bracket 130. In embodiments where there are two upper support rail members 122 along a side of the playard 100, the opposite end portions of the rail member 122 can extend within and be pivotably coupled to a medial rail connecting member 132. In one example, the medial rail connecting member 132 can be made of metal or plastic and can facilitate pivoting of adjacent rail members 122. Each medial rail connecting member 132 can include a latch mechanism for automatically latching adjacent rail members 122 in place when the playard 100 is in the unfolded use configuration of FIGS. 1A-1B.

The lower support assembly 124 of the playard frame can include a hub member (not shown) and multiple lower support members (not shown) extending between each leg or wheel 128 and the hub member. Examples of central hub members are shown and described in U.S. Pat. No. 4,811,437 to Dillner et al., U.S. Pat. No. 5,697,111 to Dillner et al., and U.S. Pat. No. 5,819,342 to Williams, all three incorporated herein by reference in their entirety. Each lower support member can be pivotally coupled to a respective one of the legs or wheels 128. The lower support assembly can also include hub legs 125 that extend out from the hub member and include a portion that contacts the ground or other flooring surface to further stabilize the playard 100.

The corner posts 126 of the playard frame interconnect the upper 121 and lower 124 support assemblies of the playard 100. In particular, a bottom end portion of each corner post 126 can be secured to an associated leg or wheel 128, and the opposite top end portion of the corner post 126 can be secured to an associated corner bracket 130. In one example folding of the playard 100 can occur by actuating the hub member and the medial rail connecting members 132, which allows the playard 100 to be collapsed from an expanded (e.g., unfolded, use) configuration, as shown in FIG. 1A, to a collapsed (e.g., folded, stored) configuration for storage or insertion into packaging prior to sale.

When the mattress or padded panel member is in place over the bottom panel 160, the lower support members 125 and the hub member, along with the bottom panel 160, can support the mattress or padded panel member. To position the mattress or padded panel member in place on the bottom panel 160, the mattress or padded panel member can be bent at the joints between the stiffening platforms and then unfolded into place in the playard 100. The mattress or padded panel member can serve the dual purpose of providing a smooth playing surface for the child when inserted in the playard 100, or it can be removed from the playard 100 and folded into a carrying case for the playard 10 when the playard 10 is in the collapsed (e.g., folded, stored) configuration.

The playard 100 can also include a bassinet 156 removably coupled to the playard 100. In one example embodiment, as shown in FIG. 1A, the bassinet 156 can include a bottom panel 166 creating an infant support surface. The bottom panel 166 can be surrounded by a perimeter side wall of the bassinet 156 that has a pair of opposed end panels 168 and a pair of opposed side panels 170. The bassinet 156 can be sized to substantially fit the interior of the interior perimeter of the playard 100 as defined by the side wall panels 112A, 112B, 112C and 112D. The side panels 170 and end panels 168 of the bassinet 156 are generally flush against or adjacent the interior surfaces of the side wall panels 112A, 112B, 112C, 112D of the playard 100. In certain example embodiments, the height of the side panels 170 and end panels 168 of the bassinet 156 are significantly shorter than the side wall panels 112A, 112B, 112C, 112D of the playard 100. As a result, the bottom panel 166 of the bassinet 156 is elevated above the bottom panel 160 and the mattress or padded panel member when installed.

The bassinet 156 can also include a number of mounting clips or other devices (not shown) positioned along the top edges of the side panels 170 and/or end panels 168 of the bassinet 156. In one example, the mounting clips can be generally inverted, elongated, U-shaped hooks that are formed of plastic and sewn to the top edges of the side panels 170 and or end panels 168 of the bassinet 156. The mounting clips attach to or hook onto the upper support rail members 122 of the playard 100. When installed, the bassinet 56 is supported around its perimeter by the several mounting clips.

As will become evident to those having ordinary skill in the art upon reading this disclosure, the devices and methods used to install the bassinet 156 on the playard 100 may vary considerably. For example, the number, arrangement, positioning, and configuration of the mounting clips may vary from the examples provided. Furthermore, while the clips in this example are described as being sewn to the bassinet panels, in other example embodiments, the clips or other attachment devices may be secured to or integrated with the bassinet 156 in other ways. The structure and configuration of the bassinet 156 may also vary from that shown. In certain example embodiments, the bottom panel 166 and the side 170 and end 168 panels can be formed of a flexible fabric or plastic material, may include a stiffening panel, and may include a mattress separate from the stiffening panels. Stiffeners, padding, and other features, such as soft goods, may be added to the bassinet side wall panels and sleeping surface, if desired. Also, a mesh material may be added strategically at locations on the bassinet to provide air flow to the sleeping surface, to effect weight reduction, and the like.

The playard 100 can also include a changing table (not shown) removably and/or rotatably coupled to an rotatable with respect to the playard 100 and/or the bassinet 156. The changing table may be conventionally configured and secured to the upper support rail members 122 of the playard 100 and/or the top edges of the side panels 170 and or end panels 168 of the bassinet 156. In one example, the changing table can occupy approximately half of the area provided by the bassinet 156.

The children's products, such as the playard 100, can include a point-of-purchase marketing display 150 that is integrally formed with the playard 100. In certain examples, the point-of-purchase marketing display 150 can have a backing or base material upon which writing or illustrations are provided. Examples of writing or illustration that may be provided on the point-of-purchase marketing display 150 includes but is not limited to the name of the manufacturer, the name of the children's product, description of the children's product and its features, illustrations of the children's product in use, a listing of any use restrictions, the price of the children's product, and/or discount information for the children's product. This information may be provided in written and/or picture format on the point-of-purchase marketing display 150. The point-of-purchase marketing display backing or base material can be made of polyester, polypropylene, polyethylene, mesh, non-woven materials, and/or other materials or combinations thereof known to those of ordinary skill in the art. In certain examples, the backing or base material for the point-of-purchase marketing display 150 is formed with a wrinkle-free or wrinkle-resistant material that permits printing thereon. By using a wrinkle-free or wrinkle resistant material, the point-of-purchase marketing display 150 can be permanently, (e.g., fixedly) attached to the children's product (e.g., the playard 100, stroller, or other child containment systems) and the children's product can be placed in the collapsed (e.g., folded, stored) configuration and placed into product packaging for shipment to the retailer and can then be removed from the product packaging and adjusted to the expanded (e.g., unfolded, use) configuration without having to iron, remove wrinkles, clean, attach, or otherwise unfold the point-of-purchase marketing display 150 as it will be automatically properly positioned and attached on the children's product and will be in a generally wrinkle-free state. may be incorporated into the display.

The point-of-purchase marketing display 150 can have any shape and dimensions. In certain examples, the point-of-purchase marketing display 150 can have a rectangular shape. In other examples, the point-of-purchase marketing display 150 can have a shape that generally corresponds to the shape of the side panel 170 or end panel 168 of the playard 100. In another example, the point-of-purchase marketing display can have any other type of shape. In certain examples, the point-of-purchase marketing display 150 can include a first side edge 152, a second side edge 154 opposite the first side edge 152, a bottom edge 156 and an opposing top edge 158. Each of the first side edge 152, second side edge 154, bottom edge 156, and top edge 158 can be linear, curvilinear, or another shape.

In one example, as shown in FIG. 1B, the point-of-purchase marketing display 150 can be sized and shaped to cover all or a portion of one of the end side panel portions 112B, 112D of the playard 100. For example, the length of the point-of-purchase marketing display 150 can be the same or substantially equal to the width W of the end side panel portions 112B, 112D. Alternatively, the length of the point-of-purchase marketing display 150 can be greater than 50% of the width W of the end side panel portions 112B, 112D and preferably greater than 75% of the width W of the end side panel portions 112B, 112D. Further, the height of the point-of-purchase marketing display 150 can be the same or substantially equal to the height H of the end side panel portions 112B, 112D. Alternatively, the height of the point-of-purchase marketing display 150 can be greater than 50% of the height H of the end side panel portions 112B, 112D and preferably greater than 75% of the height H of the end side panel portions 112B, 112D. In one example, at least one of the length and height of the point-of-purchase marketing display 150 in the expanded (e.g., unfolded or unbunched) configuration is such that the display 150 will not fit within the product packaging for shipment in the expanded configuration.

In another example, as shown in FIG. 1A, the point-of-purchase marketing display 150 can be sized and shaped to cover all or a portion of one of the side panel portions 112A, 112C of the playard 100. For example, the length of the point-of-purchase marketing display 150 can be the same or substantially equal to the length L of the side panel portion 112A, 112C. Alternatively, the length of the point-of-purchase marketing display 150 can be greater than 50% of the length L of the side panel portion 112A, 112C and preferably greater than 75% of the length L of the side panel portion 112A, 112C. Further, the height of the point-of-purchase marketing display 150 can be the same or substantially equal to the height H2 of the side panel portion 112A, 112C. Alternatively, the height of the point-of-purchase marketing display 150 can be greater than 50% of the height H2 of the side panel portion 112A, 112C and preferably greater than 75% of the height H2 of the side panel portion 112A, 112C. In one example, at least one of the length and height of the point-of-purchase marketing display in the expanded (e.g., unfolded or unbunched) configuration is such that the display 150 will not fit within the product packaging for shipment in the expanded configuration.

In certain examples, the point-of-purchase marketing display 150 can be made of the base material discussed above and fixedly coupled to one or more of the side panel portions 112A, 112B, 112C, or 112D such that the point-of-purchase marketing display 150 cannot be removed from the children's product without cutting it out or through significant force to rip it off the playard 100. For example, the outer perimeter of the point-of-purchase marketing display 150 can be sewn, glued, or heat-staked to the playard 100. For example, the point-of-purchase marketing display 150 can be fixedly coupled to the end side panel portion 112B or 112D, side panel portions 112A or 112C, and/or the adjacent outer corner panels 118 along the outer-facing side of the side panel portions 112A, 112B, 112C, 112D.

In another example, the point-of-purchase marketing display 150 can be fixedly coupled to the one or more of the side panel portions 112A, 112B, 112C, 112D, and/or the adjacent outer corner panels 118 along the inner-facing side of the respective side panel portion 112A, 112B, 112C, or 112D and can be viewed through the mesh portion of that end side panel portion 112B or 112D or side panel portion 112A or 112C. In another example, all or a portion of one of the side panel portions 112A, 112B, 112C, or 112D can be removed (e.g., cut out) and the point-of-purchase marketing display 150 can be fixedly coupled to the remaining portion of the particular side panel portion 112A, 112B, 112C, or 112D and/or the adjacent outer corner panels 118. In yet another example, the point-of-purchase marketing display 150 can be integrally formed with the playard by screen-printing the display 150 onto the mesh portion and/or any other portion of one or more of the side panel portions 112A, 112B, 112C, and/or 112D.

In use, since the point-of-purchase marketing display 205 is integrally included on end side panel portion 112B or 112D and/or side panel portion 112A or 112C of the playard 100, a user, such as a store employee, can simply adjust the playard 100 from the collapsed (e.g., folded, stored) configuration to the expanded (e.g., unfolded, use) configuration and the display 150 will automatically unfold or unbunch itself as part of the expanding process for the playard 100 and will be immediately visible to potential purchasers along the one or more side panel portions 112A, 112B, 112C, and/or 112D. This eliminates the possibility that the retailer loses or forgets to install the point-of-purchase marketing display 150 to the playard 100 or improperly installs it onto the playard 100.

As discussed above, while the example embodiment of FIGS. 1A-1B has been described with reference to a playard 100, the concept can be modified for use with other children's products. For example, with regard to a stroller that is placed into a collapsed (e.g., folded, stored) configuration and placed within product packaging for shipment to a retailer, the seat back for the seating area of the stroller can be similarly removed and replaced with a point-of-purchase marketing display that is fixedly coupled to the adjacent stroller soft goods or other components in substantially the same manner as described above. In this way, the retailer can simply remove the stroller from the product packaging and adjust the stroller from the collapsed (e.g., folded, stored) configuration to the expanded (e.g., unfolded, use) configuration and place the stroller on display at the retail location.

Figure 2:
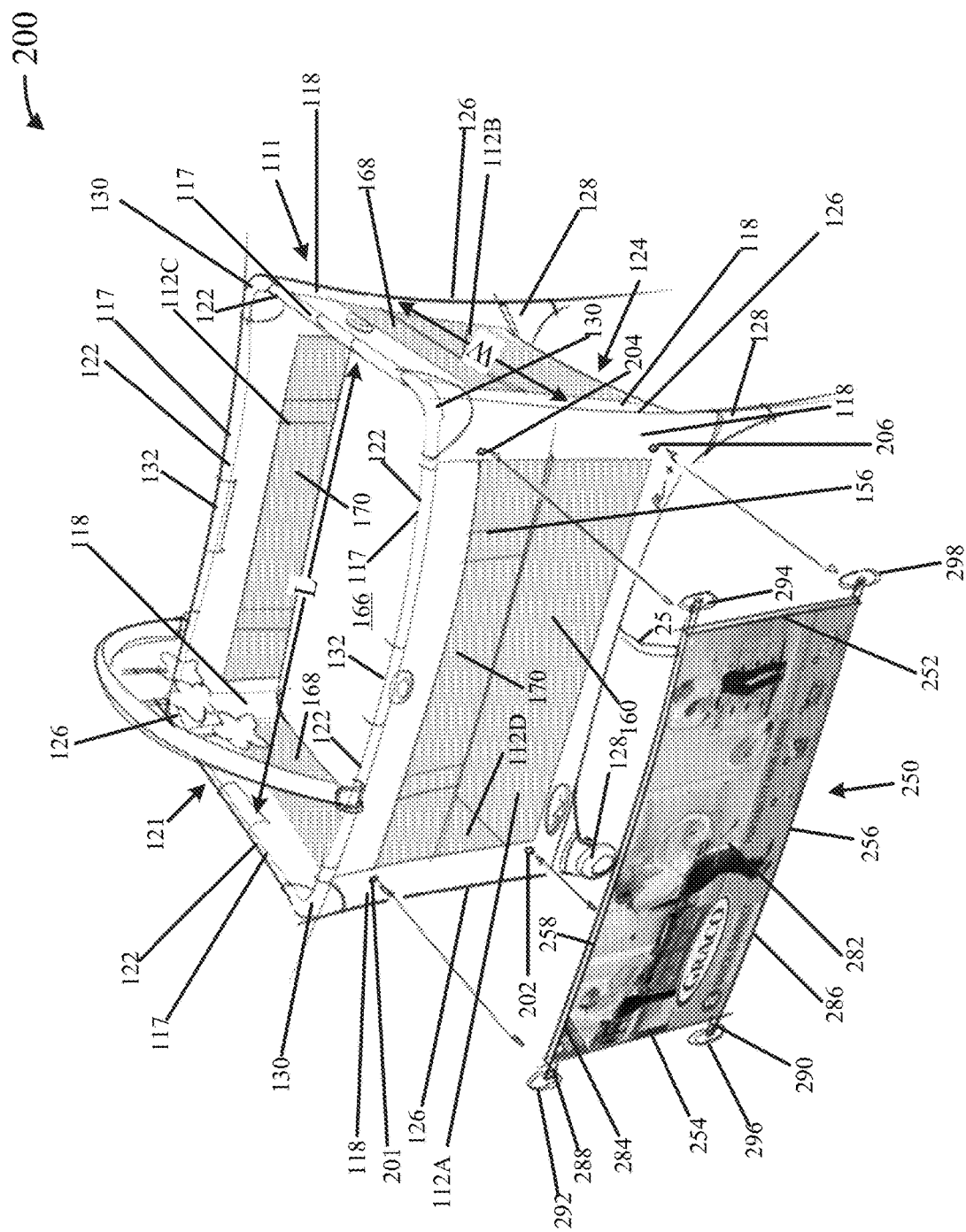
FIG. 2 presents a perspective view of a children's product, in this example a playard, in the expanded (e.g., unfolded, use) configuration with an attachable point-of-purchase marketing display, in accordance with another example embodiment of the disclosure.

FIG. 2 presents a perspective view of a children's product, in this example a playard 200, in the expanded (e.g., unfolded, use) configuration with an attachable point-of-purchase marketing display 250, in accordance with another example embodiment of the disclosure. Referring now to FIG. 2, the playard 200 can include one or more flexible side panels 111. In one example, the flexible side panel 111 can include four side panel portions 112 (112A, 112B, 112C, 112D, which can be referred to individually or collectively a the side panel portions 112), each side panel portion 112 forming one of the sides of a four-sided playard 200. In one example, the side panel portions 112A, 112B, 112C, 112D can be integrally formed as a single side wall panel. In other example embodiments, each side panel portion 112A, 112B, 112C, 112D can be joined together by vertically extending outer corner panels 118. While the example embodiment of FIG. 2 shows four side panel portions 112A, 112B, 112C, 112D, in other example embodiments, the playard 200 can include anywhere between one (e.g., circular or oval) to ten side panel portions depending on the number of sides provided on the playard, which can also be anywhere between 1-10 sides.

In one example, each side panel portion 112A, 112B, 112C, 112D can include at least a portion that is flexible. These flexible side panel portions 112A, 112B, 112C, 112D (or the area at which the side panel portions are coupled to another side panel portion) can hug the vertically extending corner posts 126 of the playard 200 that extend up from each leg/wheel 128 at the outer panels 118 so that adjacent side panel portions 112A, 112B, 112C, or 112D extend at an angle relative to each other to form a corner or radiused edge of the playard 200. For a rectangular-shaped playard, each side panel portion 112A, 112B, 112C, 112D can extend at an angle of approximately 90 degrees relative to the adjacent side panel portions. Other angles can be created at the transition from one side panel portion to another side panel portion based on the particular shape and number of sides provided for the playard 200.

In addition, one or more of the side panel portions 112A, 112B, 112C, 112D, can include at least a portion that is see-through. Further, one or more of the side panel portions 112A, 112B, 112C, 112D can include another portion that is not see through or is opaque. In one example, the see-through portion of each side panel portion 112A, 112B, 112C, 112D is surrounded or bordered along one or more sides by the opaque portion of that side panel portion. Each side panel portion 112A, 112B, 112C, 112D can be made of a fabric, mesh material, netting, or other form of soft goods. In one example, the mesh or netting is see through, enhances ventilation through the playard, and allows the child to see and to be seen.

The side panel portions 112A, 112B, 112C, 112D can be generally attached together to form the flexible side panel 111. Each of the side panel portions 112A, 112B, 112C, 112D can also include a laterally extending tubular sleeve 117 to facilitate mounting of the side panel 111 to respective upper support rail members of the playard frame, as will be described below.

The playard 200 can also include a flexible bottom panel 160 that is attached to the lower edge of the side panels 112A, 112B, 112C, 112D. In one example embodiment, the flexible bottom panel 160 can be sewn to or otherwise fixedly coupled to the side panels 112. The playard 200 also can include a removable mattress or padded panel member (not shown) that can be positioned above and rest on the bottom panel 160. The mattress or padded member can include a foam cushion enclosed in a layer or layers of fabric or plastic material, such as nylon, that form a pad cover. The mattress or padded panel member typically can be partitioned into two or more sections (e.g., four sections), each containing one of four rigid stiffening platforms.

The playard 200 can also include four inner corner panels or four vertically extending tubular sleeves (not shown), which are attached to the inner sides of adjacent side panel portions 112 or which are configured to receive the vertically extending corner posts 126. In example embodiments with corner panels, the corner panel can be attached to the inner sides of adjacent side panel portions 112A and 112B, 112B and 112C, 112C and 112D, and/or 112D and 112A. A corner panel can be attached to the inner surfaces of adjacent side panel portions 112A and 112B, 112B and 112C, 112C and 112D, and/or 112D and 112A at each corner area of the playard 200 so that the corner panel is spaced from and covers or hides the respective corner post 126 of the playard 200. The corner panel can be made of a flexible sheet material and can be stretched so that it remains taut between the adjacent side panel portions 112A and 112B, 112B and 112C, 112C and 112D, and/or 112D and 112A. The corner panel, or alternatively, the vertically extending tubular sleeve, effectively isolates the corner post 126 extending up from the respective leg or wheel 128 from an interior space of the playard 200 defined by the playard bottom panel 160 and the side panel portions 112A, 112B, 112C, 112D so that a child placed within the playard 200 cannot accidentally come into contact with the corner post 126 and/or the leg or wheel 128, which forms part of the rigid frame of the playard 200.

A frame structure of the playard 200 can include an upper support assembly 121, a lower support assembly 124, and corner posts 126. The lower support assembly 124 can include rigid corner leg connectors at or adjacent the bottom end of each respective corner post 126 to couple and/or rotatably couple at least a portion of the lower support assembly 124 to the respective corner post 126. The upper support assembly 121 can include rigid corner rail connectors or corner brackets 130 at or adjacent the top end of each respective corner post 126 to couple and/or rotatably couple at least a portion of the upper support assembly 121 to the respective corner post 126.

In some embodiments, the corner brackets 130 and rigid corner leg connectors can be made of metal, plastic, or an alloy, In one example, each corner bracket 130 and rigid corner leg connector can be molded from a polymeric plastic material such as ABS.

The upper support assembly 121 includes at least four upper support rail members 122, one for each side of the playard 200. Each upper support rail member 122 can include one or two elongated members (e.g., solid or tubular rails). In one example, each side of the playard 200 includes two elongated members (e.g., solid or tubular rails). In this example embodiment, all four upper support rails can be adjusted from an expanded (e.g., unfolded, use) configuration to a collapsed (e.g., folded, stored) configuration and vice-versa.

In another example embodiment, two opposing sides of the upper support assembly 121 include two elongated members (e.g., solid or tubular rails), while the other two opposing sides include one elongated member (e.g., solid or tubular rails) each. In this example embodiment, the two opposing sides with two elongated members (e.g., the two longer sides of the playard 200) can be foldable from an expanded (e.g., unfolded, use) configuration to a collapsed (e.g., folded, stored) configuration and vice-versa, while the other two opposing sides (e.g., the two shorter sides of the playard 200) may remain laterally disposed as the playard is adjusted from the expanded (e.g., unfolded, use) configuration to the collapsed (e.g., folded, stored) configuration and back again.

In one example, each upper support rail member 122 in the expanded (e.g., unfolded, use) configuration can be linear or substantially linear, as shown in FIG. 2, to create a straight or substantially straight upper rail member. Alternatively, one or more of the upper support rail members 122 can be curved to create a curved upper rail member. In certain example embodiments, end portions of the upper support rail members 122 are received in and pivotal with respect to a respective corner bracket 130. In embodiments where there are two upper support rail members 122 along a side of the playard 200, the opposite end portions of the rail member 122 can extend within and be pivotable with respect to a medial rail connecting member 132. In one example, the medial rail connecting member 132 can be made of metal and can facilitate pivoting of adjacent rail members 122. Each medial rail connecting member 132 can include a latch mechanism for automatically latching adjacent rail members 122 in place when the playard is in the expanded (e.g., unfolded, use) configuration of FIG. 2.

The lower support assembly 124 of the playard frame can include a hub member (not shown) and multiple lower support members (not shown) extending between each leg or wheel 128 and the hub member. Each lower support members can be pivotally coupled to a respective one of the legs or wheels 128. The lower support assembly can also include hub legs 125 that extend out from the hub member to further stabilize the playard 200.

The corner posts 126 of the playard frame interconnect the upper 121 and lower 124 support assemblies of the playard 200. In particular, a bottom end portion of each corner post 126 can be secured to an associated leg or wheel 128, and the opposite top end portion of the corner post 126 can be secured to an associated corner bracket 130. By actuating the hub member and the medial rail connecting members 132, the playard 200 can be collapsed from an expanded (e.g., unfolded, use) configuration, as shown in FIG. 2, to a collapsed (e.g., folded, stored) configuration for storage or placement in product packaging for sale.

When the mattress or padded panel member is in place over the bottom panel 160, the lower support members 125 and the hub member 126, along with the bottom panel 160, can support the mattress or padded panel member. To position the mattress or padded panel member in place on the bottom panel 160, the mattress or padded panel member can be bent at the joints between the stiffening platforms and then unfolded into place in the playard 200. The mattress or padded panel member can serve the dual purpose of providing a smooth playing surface for the child when inserted in the playard 200, or it can be removed from the playard 200 and folded into a carrying case for the playard 200 when the playard 200 is in the collapsed (e.g., folded, stored) configuration, the entirety of which may then be placed into product packaging for shipment to the retailer and sale.

The playard 200 can also include a bassinet 156 removably coupled to the playard 200. In one example embodiment, as shown in FIG. 1, the bassinet 156 can include a bottom panel 166 creating an infant support surface. The bottom panel 166 can be surrounded by a perimeter side wall that has a pair of opposed end panels 168 and a pair of opposed side panels 170. The bassinet 156 can be sized to substantially fit the interior of the interior perimeter of the playard 200 as defined by the side wall panels 112A, 112B, 112C and 112D. Therefore, the side panels 170 and end panels 168 of the bassinet 156 can be positioned generally flush against or adjacent the interior surfaces of the side wall panels 112A, 112B, 112C, 112D of the playard 200. In certain example embodiments, the height of the side panels 170 and end panels 168 of the bassinet 156 are significantly shorter than the side wall panels 112A, 112B, 112C, 112D of the playard 200. As a result, the bottom panel 166 of the bassinet 156 is elevated above the bottom panel 160 and the mattress or padded panel member when installed.

The bassinet 156 can also include a number of mounting clips or other devices (not shown) positioned along the top edges of the side panels 170 and/or end panels 168 of the bassinet 156. In one example, the mounting clips can be generally inverted, elongated, U-shaped hooks that are formed of plastic and sewn to the top edges of the side panels 170 and or end panels 168 of the bassinet 156. The mounting clips attach to or hook onto the upper support rail members 122 of the playard 200. When installed, the bassinet 156 is supported around its perimeter by the several mounting clips.

As will become evident to those having ordinary skill in the art upon reading this disclosure, the devices and methods used to install the bassinet 156 on the playard 200 may vary considerably. For example, the number, arrangement, positioning, and configuration of the mounting clips may vary from the examples provided. Furthermore, while the clips in this example are described as being sewn to the bassinet panels, in other example embodiments, the clips or other attachment devices may be secured to or integrated with the bassinet 156 in other ways. The structure and configuration of the bassinet 156 may also vary from that shown. In certain example embodiments, the bottom panel 166 and the side 170 and end 168 panels can be formed of a flexible fabric material, may include a stiffening panel, and may include a mattress separate from the stiffening panels. Stiffeners, padding, and other soft goods features may be added to the bassinet side wall panels and sleeping surface, if desired. Also, a mesh material may be added strategically at locations on the bassinet 156 to provide air flow to the sleeping surface, to effect weight reduction, and the like.

The playard 200 can also include a changing table (not shown) removably and/or rotatably coupled to the playard 200 and/or the bassinet 156. The changing table may be conventionally configured and secured to the upper support rail members 122 of the playard 200 and/or the top edges of the side panels 170 and or end panels 168 of the bassinet 156. In one example, the changing table can occupy approximately half of the area provided by the bassinet 156.

As shown in FIG. 2, a point-of-purchase marketing display 250 can be removably coupled to the playard 200. The point-of-purchase marketing display 250 can be an advertisement for the playard 200 to which it can be removably coupled and decoupled. In certain examples, the point-of-purchase marketing display 250 can have a backing or base material 282 upon which writing or illustrations are provided. Examples of writing or illustration that may be provided on the point-of-purchase marketing display 250 includes but is not limited to the name of the manufacturer, the name of the children's product, description of the children's product and its features, illustrations of the children's product in use, a listing of any use restrictions, the price of the children's product, and/or discount information for the children's product. This information may be provided in written and/or picture format on the point-of-purchase marketing display 250. This allows potential purchasers to learn more about the playard 10 while contemplating a purchase.

The point-of-purchase marketing display backing or base material 282 can be made of polyester, polypropylene, polyethylene, mesh, non-woven materials, and/or other materials or combinations thereof known to those of ordinary skill in the art. In certain examples, the backing or base material 282 for the point-of-purchase marketing display 250 is formed with a wrinkle-free or wrinkle-resistant material that permits printing thereon. By using a wrinkle-free or wrinkle resistant material, the point-of-purchase marketing display 250 can be provided with the children's product (e.g., the playard 200, stroller, or other child containment system) and folded and packaged with the children's product when it is placed in the collapsed (e.g., folded, stored) configuration and placed into product packaging for shipment to the retailer and can then be removed from the product packaging and unbunched or unfolded and can be coupled to the children's product once it has been adjusted to the expanded (e.g., unfolded, use) configuration without having to iron, remove wrinkles, clean, attach, or otherwise unfold the point-of-purchase marketing display 250.

In other embodiments, the point-of-purchase marketing display can be removably coupled to the playard 200, as discussed below, prior to shipment to the retailer. The playard 200 can then be adjusted to the collapsed (e.g., folded, stored) configuration and placed into product packaging with the point-of-purchase marketing display 250 removably attached. In this embodiment, the point-of-purchase marketing display can then fold and bunch up with the rest of the playard 200 as it is being adjusted to the collapsed (e.g., folded, stored) configuration, and can then be unfolded with the playard 200 when the playard 200 is adjusted to the expanded (e.g., unfolded, use) configuration at the retailer. In this embodiment, the point-of-purchase marketing display will be automatically properly positioned and attached on the children's product and will be in a generally wrinkle-free state.

The point-of-purchase marketing display base 282 can have any shape and dimensions. In certain examples, the point-of-purchase marketing display base 282 can have a rectangular shape. In other examples, the point-of-purchase marketing display base 282 can have a shape that generally corresponds to the shape of the side panel side panel portion 112A, 112C or side panel portion 112B, 112D of the playard 200. In another example, the point-of-purchase marketing display base 282 can have any other type of shape. In certain examples, the point-of-purchase marketing display base 282 can include a first side edge 252, a second side edge 254 opposite the first side edge 252, a bottom edge 256 and an opposing top edge 258. Each of the first side edge 252, second side edge 254, bottom edge 256, and top edge 258 can be linear, curvilinear, or another shape.

The point-of-purchase marketing display 250 can include a rigid or semi-rigid top support member 288 and a rigid or semi-rigid bottom support member 290. In one example, each of the top support member 288 and bottom support member 290 can be a rod, pipe, or other elongated member that can be constructed of metal, plastic, wood, or any other type of material. In another example embodiment, only a top support member 288 may be used.

In one example, the display base 282 can have a length that is equal or substantially equal to the length L of the side panel portion 112A or 112C. In another example, the display panel can have a length that is at least 75% of the length L of the side panel portion 112A or 112C and a height in order to cover the entirety of the mesh or netting material of the side panel portion 112A or 112C. In one example, at least one of the length and height of the point-of-purchase marketing display base 282 in the expanded (e.g., unfolded or unbunched) configuration is such that the display base 282 will not fit within the product packaging for shipment in the expanded configuration.

In one example, the display base 282 can also include a top looped or channel section 284. The top channel section 284 can be positioned along or adjacent to the top edge of the display base 282 and can extend along all or substantially all of the length of the top edge of the display base 282. The top channel section 284 can provide or define a passageway through the top channel section 284 that is sized and shaped to receive the top support member 288. The top support member 288 may have a length such that at least a portion of the top support member 288 extends out from each of the right and left sides of the top channel section 284 of the display base 282 when the top support member 288 is extending through the passageway of the top channel section 284. In another example embodiment, the display base 282 may not include the top channel section 284 and the top support member 288 can be coupled to the display base 282 along the top edge of the display base 282.

In one example embodiment, the display base 282 can also include a bottom looped or channel section 286. The bottom channel section 286 can be positioned along or adjacent to the bottom edge of the display base 282 and can extend along all or substantially all of the length of the bottom edge of the display base 282. The bottom channel section 286 can provide or define a second passageway through the bottom channel section 286 that is sized and shaped to receive the bottom support member 290. The bottom support member 290 may have a length such that at least a portion of the bottom support member 290 extends out from each of the right and left sides of the bottom channel section 286 of the display base 282 when the bottom support member 290 is extending through the passageway of the bottom channel section 286. In another example embodiment, the display base 282 may not include a bottom channel section 286 and the bottom support member 290 can be coupled to the display base 282 along the bottom edge of the display base 282.

The top support member 288 can include a first end and a distal second end. Along or adjacent to the first end, the top support member 288 can include a first attachment means 292 for attaching the top support member 288 to the playard 200. The first attachment means 292 can be coupled to the top support member 288. The first attachment means 292 can include, but is not limited to, a hook, loop tape, a button, a snap, a wire-tie, string or any other known attachment means. Along the distal second end, the top support member 288 can include a second attachment means 294 for attaching the top support member 288 to the playard 200. The second attachment means 294 can be coupled to the top support member 288. The second attachment means 294 can include, but is not limited to, a hook, loop tape, a button, a snap, a wire-tie, string or any other known attachment means.

The bottom support member 290 can include a first end and a distal second end. Along or adjacent to the first end, the bottom support member 290 can include a third attachment means 96 for attaching the top support member 288 to the playard 200. The third attachment means 296 can be coupled to the bottom support member 290. The third attachment means 296 can include, but is not limited to, a hook, loop tape, a button, a snap, a wire-tie, string or any other known attachment means. Along the distal second end, the bottom support member 290 can include a fourth attachment means 298 for attaching the bottom support member 290 to the playard 200. The fourth attachment means 298 can be coupled to the bottom support member 290. The fourth attachment means 298 can include, but is not limited to, a hook, loop tape, a button, a snap, a wire-tie, string or any other known attachment means.

One or more of the side panel portion 112A, 112B, 112C, or 112D of the playard 200 can include corresponding fifth attachment means 201, sixth attachment means 204, seventh attachment means 202, and eighth attachment means 206 that correspond with the first attachment means 292, second attachment means 294, third attachment means 296, and fourth attachment means 298. Each of the fifth attachment means 201, sixth attachment means 204, seventh attachment means 202, and eighth attachment means 206 can be positioned along or through the wall of one of the side panels 112A, 112B, 112C, or 112D. Each of the fifth attachment means 201, sixth attachment means 204, seventh attachment means 202, and eighth attachment means 206 can be at least one aperture through the particular side panel 112A, 112B, 112C, or 112D, a snap, a button, a button loop, a hook loop, or any other known attachment means. Each of the fifth attachment means 201, sixth attachment means 204, seventh attachment means 202, and eighth attachment means 206 can be configured to receive or otherwise couple to the corresponding first attachment means 292, second attachment means 294, third attachment means 296, and fourth attachment means 298, to couple the display 250 to the playard 200. While the example embodiment of FIG. 1 shows the display 250 being removably coupled to the side panel portion 112A, in other example embodiments, it can be similarly coupled to any of the other side panel portions 112B-112D.

In use, a user, such as a store employee, can adjust the playard 200 from the collapsed (e.g., folded, stored) configuration to the expanded (e.g., unfolded, use) configuration. The user can then couple the display 250 to one of the side panels 112A, 112B, 112C, or 112D of the playard 200 by coupling the first attachment means 292 to the fifth attachment means 201, the second attachment means 294 to the sixth attachment means 204, the third attachment means 296 to the seventh attachment means 202, and the fourth attachment means 298 to the eighth attachment means 206. Alternatively, the display 250 can be coupled to one of the side panels 112A, 112B, 112C, or 112D of the playard 200 at the time of manufacture or at least prior to transporting the playard 200 to the store or other retailer. In either embodiment, the display 250 can remain coupled to the side panel 112A, 112B, 112C, or 112D of the playard 200 as the playard 200 is adjusted from the expanded (e.g., unfolded, use) configuration to the collapsed (e.g., folded, stored) configuration and from the collapsed (e.g., folded, stored) configuration to the expanded (e.g., unfolded, use) configuration, as needed. The flexible and wrinkle-free or wrinkle-resistant nature of the display 250 allows the display 250 to be folded or bunched with the remainder of the playard 200 without damaging the display 250. The display 250 can be removed from the playard 200 in the opposite manner.

Figure 3:
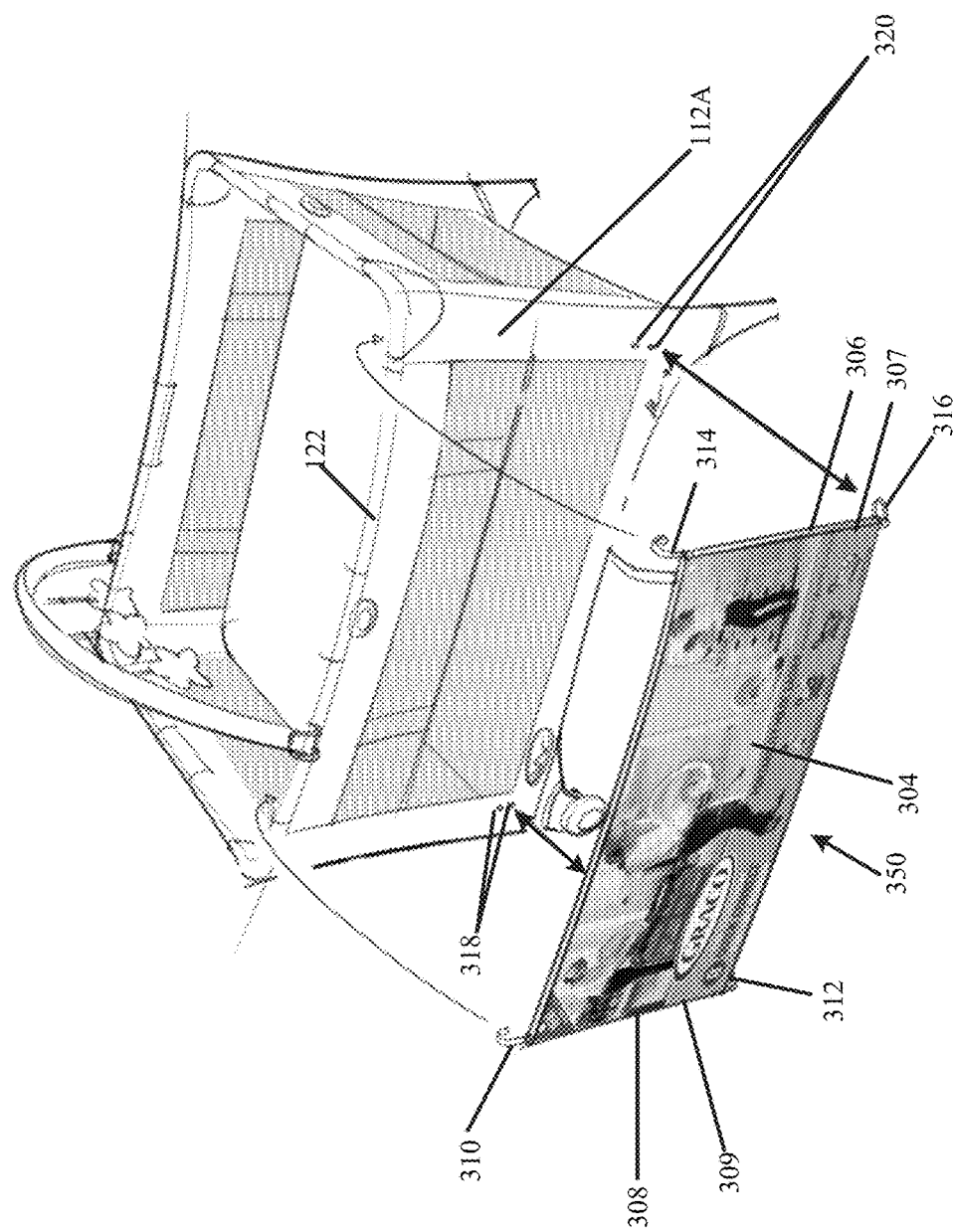
FIG. 3 is a perspective view of a children's product, in this example a playard, in the expanded (e.g., unfolded, use) configuration with another version of an attachable point-of-purchase marketing display, in accordance with another example embodiment of the disclosure.

FIG. 3 is a perspective view of another alternative playard 300 in the expanded (e.g., unfolded, use) configuration with another attachable and detachable point-of-purchase marketing display 350, in accordance with another example embodiment of the disclosure. The elements of the playard 300 are the same as the elements for the playards 100 and 200 described in FIG. 1A-2 except as described below and the description of the playard 200 of FIG. 2 is incorporated herein. Referring to FIG. 3, the playard 300 can include a point-of-purchase marketing display 350 that can be removably coupled to the playard 300. Alternatively, as discussed above, the point-of-purchase marketing display can be incorporated for use with other children's products, such as a stroller or other foldable child containment systems.

The point-of-purchase marketing display 350 can be an advertisement for the playard 300 or other children's product to which it can be removably coupled and decoupled. In certain examples, the point-of-purchase marketing display 350 can have a backing or base material 304 upon which writing or illustrations are provided. Examples of writing or illustration that may be provided on the point-of-purchase marketing display 350 includes but is not limited to the name of the manufacturer, the name of the children's product, description of the children's product and its features, illustrations of the children's product in use, a listing of any use restrictions, the price of the children's product, and/or discount information for the children's product. This information may be provided in written and/or picture format on the point-of-purchase marketing display 350. This allows potential purchasers to learn more about the playard 300 while contemplating a purchase.

The point-of-purchase marketing display backing or base material 304 can be made of polyester, polypropylene, polyethylene, mesh, non-woven materials, and/or other materials or combinations thereof known to those of ordinary skill in the art. In certain examples, the backing or base material 304 for the point-of-purchase marketing display 350 is formed with a wrinkle-free or wrinkle-resistant material that permits printing thereon. By using a wrinkle-free or wrinkle resistant material, the point-of-purchase marketing display 350 can be provided with the children's product (e.g., the playard 300, stroller, or other child containment system) and folded and packaged with the children's product when it is placed in the collapsed (e.g., folded, stored) configuration and placed into product packaging for shipment to the retailer and can then be removed from the product packaging and unbunched or unfolded and can be coupled to the children's product once it has been adjusted to the expanded (e.g., unfolded, use) configuration without having to iron, remove wrinkles, clean, attach, or otherwise unfold the point-of-purchase marketing display 350.

In other embodiments, the point-of-purchase marketing display 350 can be removably coupled to the playard 300 prior to shipment to the retailer. The playard 300 can then be adjusted to the collapsed (e.g., folded, stored) configuration and placed into product packaging with the point-of-purchase marketing display 350 removably attached. In this embodiment, the point-of-purchase marketing display 350 can then fold and bunch up with the rest of the playard 300 as it is being adjusted to the collapsed (e.g., folded, stored) configuration, and can then be unfolded with the playard 300 when the playard 300 is adjusted to the expanded (e.g., unfolded, use) configuration at the retailer. In this embodiment, the point-of-purchase marketing display will be automatically properly positioned and attached on the children's product and will be in a generally wrinkle-free state.

The point-of-purchase marketing display base 304 can have any shape and dimensions. In certain examples, the point-of-purchase marketing display base 304 can have a rectangular shape. In other examples, the point-of-purchase marketing display base 304 can have a shape that generally corresponds to the shape of the side panel side panel portion 112A, 112C or side panel portion 112B, 112D of the playard 300. In another example, the point-of-purchase marketing display base 304 can have any other type of shape. In certain examples, the point-of-purchase marketing display base 304 can include a first side edge, a second side edge opposite the first side edge, a bottom edge, and an opposing top edge. Each of the first side edge, second side edge, bottom edge, and top edge can be linear, curvilinear, or another shape.

The display 350 is configured to be attached or attachable to the playard 300 when the playard 300 is in the expanded (e.g., unfolded, use) configuration at a store selling the playard 300. This allows potential purchasers to learn more about the playard 300 while contemplating a purchase.

The point-of-purchase marketing display 350 can include a rigid or semi-rigid left-side support member 308 and a rigid or semi-rigid right-side support member 306. In one example, each of the left-side support member 308 and right-side support member 306 can be a rod, pipe, or other elongated member that can be constructed of metal, plastic, wood, or any other type of material. In one example, the point-of-purchase marketing display base 304 can have a length that is equal or substantially equal to the length L of the side panel portion 112A, 112B, 112C, or 112D to which it will be removably coupled. In another example, the point-of-purchase marketing display base 304 can have a length that is at least 75% of the length L of the side panel portion 112A, 112B, 112C, or 112D to which it will be removably coupled and a height in order to cover the entirety of the mesh or netting material of the particular side panel portion 112A, 112B, 112C, or 112D. In one example, at least one of the length and height of the point-of-purchase marketing display 350 in the expanded (e.g., unfolded or unbunched) configuration is such that the display 350 will not fit within the product packaging for shipment in the expanded configuration.

In one example, the point-of-purchase marketing display base 304 can also include a right-side looped or channel section 309. The right-side channel section 309 can be positioned along or adjacent to the right-side edge of the point-of-purchase marketing display base 304 and can extend along all or substantially all of the length of the right-side edge of the point-of-purchase marketing display base 304. The right-side channel section 309 can provide or define a passageway through the right-side channel section 309 that is sized and shaped to receive the right-side support member 308. The right-side support member 308 may have a length such that at least a portion of the right-side support member 308 extends out from each of the top and bottom sides of the right-side channel section 309 of the point-of-purchase marketing display base 304 when the right-side support member 308 is extending through the passageway of the right-side channel section 309. In another example embodiment, the point-of-purchase marketing display base 304 may not include the right-side channel section 309 and the right-side support member 308 can be coupled to the display panel 302 along the right-side edge.

In one example embodiment, the point-of-purchase marketing display base 304 can also include a left-side looped or channel section 307. The left-side channel section 307 can be positioned along or adjacent to the left-side edge of the point-of-purchase marketing display base 304 and can extend along all or substantially all of the length of the left-side edge of the point-of-purchase marketing display base 304. The left-side channel section 307 can provide or define a second passageway through the left-side channel section 307 that is sized and shaped to receive the left-side support member 306. The left-side support member 306 may have a length such that at least a portion of the left-side support member 306 extends out from each of the top and bottom sides of the left-side channel section 307 of the point-of-purchase marketing display base 304 when the left-side support member 306 is extending through the passageway of the left-side channel section 307. In another example embodiment, the point-of-purchase marketing display base 304 may not include a left-side channel section 307 and the left-side support member 306 can be coupled to the point-of-purchase marketing display base 304 along the left-side edge.

The right-side support member 308 can include a first end and a distal second end. Along or adjacent to the first end, the right-side support member 308 can include a first attachment means 310 for attaching the right-side support member 308 to the playard 300. The first attachment means 310 can be coupled to or integrally formed with the right-side support member 308. The first attachment means 310 can include, but is not limited to, a hook (e.g., a curved hook, a J-shaped hook), loop tape, a button, a snap, a wire-tie, string or any other known attachment means. In one example, the first attachment means 310 is a hook. Along the distal second end, the right-side support member 308 can include a second attachment means 312 for attaching the right-side support member 308 to the playard 300. The second attachment means 312 can be coupled to or integrally formed with the right-side support member 308. The second attachment means 312 can include, but is not limited to, a hook, loop tape, a button, a snap, a wire-tie, string or any other known attachment means. In one example, the second attachment means 312 is loop tape.

The left-side support member 306 can include a first end and a distal second end. Along or adjacent to the first end, the left-side support member 306 can include a third attachment means 314 for attaching the left-side support member 306 to the playard 300. The third attachment means 314 can be coupled to the left-side support member 306. The third attachment means 314 can include, but is not limited to, a hook (e.g., a curved hook, a J-shaped hook), loop tape, a button, a snap, a wire-tie, string or any other known attachment means. In one example, the third attachment means 314 is a hook. Along the distal second end, the left-side support member 306 can include a fourth attachment means 316 for attaching the left-side support member 306 to the playard 300. The fourth attachment means 316 can be coupled to or integrally formed with the left-side support member 306. The fourth attachment means 316 can include, but is not limited to, a hook, loop tape, a button, a snap, a wire-tie, string or any other known attachment means. In one example, the fourth attachment means 316 is loop tape.

One or more side panel portions 112A, 112B, 112C, or 112D of the playard 300 can include corresponding fifth attachment means 318 and sixth attachment means 320 that correspond with the second attachment means 312 and fourth attachment means 316. Each of the fifth attachment means 318 and sixth attachment means 320 can be positioned along or through the wall of particular side panel portion 112A, 112B, 112C, or 112D. Each of the fifth attachment means 318 and sixth attachment means 320 can be one or more apertures (e.g., two closely positioned apertures) through the particular side panel portion 112A, 112B, 112C, or 112D, a snap, a button, a button loop, a hook loop, or any other known attachment means. Each of the fifth attachment means 318 and sixth attachment means 320 can be configured to receive or otherwise couple to the corresponding second attachment means 312 and fourth attachment means 316, while the first attachment means 310 and third attachment means 314 are coupled to the upper rail support member 122 (e.g., by hanging each hook over the top of the upper rail support member 122) to couple the display 350 to the playard 300. While the example embodiment of FIG. 3 shows the display 350 being removably coupled to the side panel portion 112A, in other example embodiments, it can be similarly coupled to any of the other side panels portions 112B-112D.

In use, a user, such as a store employee, can adjust the playard 300 from the collapsed (e.g., folded, stored) configuration to the expanded (e.g., unfolded, use) configuration. The user can then removably couple the display 302 to the side panel portion 112A (or any other side panel portion 112A-112D) of the playard 300 by coupling the first attachment means 310 and third attachment means 314 to the upper rail support member 22 (e.g., by hanging hooks from the display 302 over the top of the upper rail support member 122) and by coupling the second attachment means 312 to the fifth attachment means 318, and the fourth attachment means 316 to the sixth attachment means 320. Alternatively, the display 350 can be coupled to the side panel portion 112A (or any other side panel portion 112A-112D) of the playard 300 at the time of manufacture or at least prior to transporting the playard 300 to the store or other retailer. In either embodiment, the display 350 can remain coupled to the side panel portion 112A (or any other side panel portion 112A-112D) of the playard 300 as the playard 300 is adjusted from the expanded (e.g., unfolded, use) configuration to the collapsed (e.g., folded, stored) configuration and from the collapsed (e.g., folded, stored) configuration to the expanded (e.g., unfolded, use) configuration, as needed. The flexible and wrinkle-free or wrinkle-resistant nature of the display 350 allows the display 350 to be folded or bunched up with the remainder of the playard 300 without damaging or generally wrinkling the point-of-purchase marketing display 350. The display 350 can be removed from the playard 300 in the opposite manner.

Figure 4:
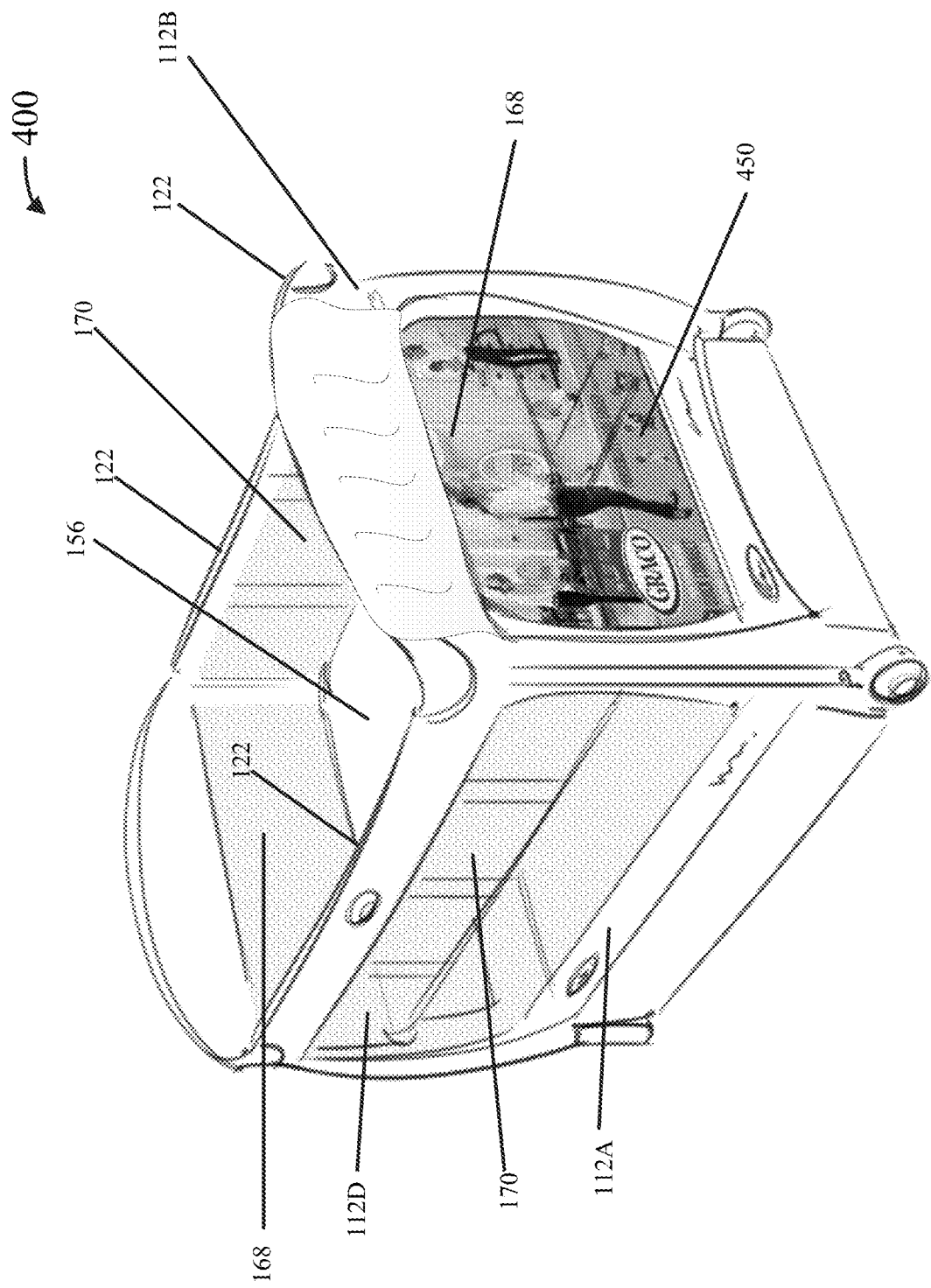
FIG. 4 is a perspective view of a children's product, in this example a playard, in the expanded (e.g., unfolded, use) configuration with yet another example of an attachable point-of-purchase marketing display coupled to and extending down from a bassinet removably coupled to the playard, in accordance with another example embodiment of the disclosure.

FIG. 4 is a perspective view of another alternative playard 400 in the use configuration with yet another point-of-purchase marketing display 450 coupled to and extending from a bassinet 156 removably coupled to the playard 400, in accordance with another example embodiment of the disclosure. The elements of the playard 400 are the same as the elements for the playards 100 and 200 described in FIGS. 1A-2 except as described below and the description of the playard 200 of FIG. 2 is incorporated herein. Referring to FIG. 4, the playard 400 can include the bassinet 156 and the point-of-purchase marketing display 450, which can be coupled to the bassinet 156. While the example embodiment of FIG. 4 shows the point-of-purchase marketing display 450 being coupled to an end panel 168 of the bassinet 156, it could also be coupled to the either one of the side panels 170 and draped over the associated upper rail support member 122.

The bassinet 156 can be removably coupled to the playard 400. In one example embodiment, the bassinet 56 can include a bottom panel 166 (see FIG. 2) creating an infant support surface. The bottom panel 166 is surrounded by a perimeter side wall that has a pair of opposed end panels 168 and a pair of opposed side panels 170. The side panels 170 and end panels 168 of the bassinet 156 can be substantially flush against or adjacent the interior surfaces of the side wall panel portions 112A, 112B, 112C, 112D of the playard 400. The height of the side panels 170 and end panels 168 of the bassinet 156 can be significantly shorter than the side wall panel portions 112A, 112B, 112C, 112D of the playard 400.

The bassinet 156 can also include a number of mounting clips or other devices (not shown) positioned along the top edges of the side panels 170 and/or end panels 168 of the bassinet 156. In one example, the mounting clips can be generally inverted, elongated, U-shaped hooks that are formed of plastic and sewn to the top edges of the side panels 170 and or end panels 168 of the bassinet 156. The mounting clips attach to or hook onto the upper rail support members 122 of the playard 400. When installed, the bassinet 156 is supported around its perimeter by the several mounting clips hanging from or otherwise coupled to the upper rail support members 122.

The point-of-purchase marketing display 450 can be an advertisement for the playard 400 or other children's product to which it can be removably coupled and decoupled. In certain examples, the point-of-purchase marketing display 450 can have a backing or base material upon which writing or illustrations are provided. Examples of writing or illustration that may be provided on the point-of-purchase marketing display 450 includes but is not limited to the name of the manufacturer, the name of the children's product, description of the children's product and its features, illustrations of the children's product in use, a listing of any use restrictions, the price of the children's product, and/or discount information for the children's product. This information may be provided in written and/or picture format on the point-of-purchase marketing display 450. This allows potential purchasers to learn more about the playard 400 while contemplating a purchase.

The point-of-purchase marketing display backing or base material can be made of polyester, polypropylene, polyethylene, mesh, non-woven materials, and/or other materials or combinations thereof known to those of ordinary skill in the art. In certain examples, the backing or base material for the point-of-purchase marketing display 450 is formed with a wrinkle-free or wrinkle-resistant material that permits printing thereon. By using a wrinkle-free or wrinkle resistant material, the point-of-purchase marketing display 450 can be provided with the children's product (e.g., the playard 400, stroller, or other child containment system) and folded and packaged with the children's product when it is placed in the collapsed (e.g., folded, stored) configuration and placed into product packaging for shipment to the retailer and can then be removed from the product packaging and unbunched or unfolded and can be coupled to the bassinet 156 once it has been adjusted to the expanded (e.g., unfolded, use) configuration without having to iron, remove wrinkles, clean, attach, or otherwise unfold the point-of-purchase marketing display 450.

In other embodiments, the point-of-purchase marketing display 450 can be removably coupled to the bassinet 156 prior to shipment to the retailer. The playard 400 can then be adjusted to the collapsed (e.g., folded, stored) configuration and placed into product packaging with the point-of-purchase marketing display 450 removably attached to the bassinet 156. In this embodiment, the point-of-purchase marketing display 450 can then fold and bunch up with the rest of the playard 400 as it is being adjusted to the collapsed (e.g., folded, stored) configuration, and can then be unfolded with the playard 400 when the playard 400 is adjusted to the expanded (e.g., unfolded, use) configuration at the retailer. In this embodiment, the point-of-purchase marketing display will be automatically properly positioned and attached on the children's product (e.g., the playard 400, stroller, or other child containment system) and will be in a generally wrinkle-free state.

The point-of-purchase marketing display base can have any shape and dimensions. In certain examples, the point-of-purchase marketing display base can have a rectangular shape. In other examples, the point-of-purchase marketing display base can have a shape that generally corresponds to the shape of the side panel side panel portion 112A, 112C or side panel portion 112B, 112D of the playard 400. In another example, the point-of-purchase marketing display base can have any other type of shape. In certain examples, the point-of-purchase marketing display base can include a first side edge, a second side edge opposite the first side edge, a bottom edge, and an opposing top edge. Each of the first side edge, second side edge, bottom edge, and top edge can be linear, curvilinear, or another shape.

The point-of-purchase marketing display 450 can be coupled to the bassinet 156. For example, the display 450 can be coupled to the one of the end panels 168 as shown in FIG. 4. Alternatively, it can be coupled to one of the side panels 170 of the bassinet 156. In one example, the display 450 may be sewn to the end panel 168 or side panel 170. Alternatively, the display 450 may be removably coupled to the end panel 168 or side panel 170 in a manner substantially similar to that described in FIGS. 2 and 3 above. The display 450 is configured to extend over (e.g., be draped over) the upper rail support 122 of the side wall panel portion 112A, 112B, 112C, or 112D adjacent the end panel 168 or side panel 170 that the point-of-purchase marketing display 450 is coupled to and then extend down along the respective side wall panel portion 112A, 112B, 112C, or 112D past the bottom edge of the end panel 168 or side panel 170. In one example, the display 450 extends down to substantially the bottom panel 160 of the playard 400. While the example embodiment shows the display 450 being coupled to an end panel 168 of the bassinet 156, in other example embodiments, the display 450 can be coupled to one of the side panels 170.

The display 450 is configured to be attached or attachable to the playard 400 by attaching the bassinet 156 to the playard 400 in the manner described above, when the playard 400 is in the expanded (e.g., unfolded, use) configuration at a store selling the playard 400. This allows potential purchasers to learn more about the playard 400 while contemplating a purchase. In one example, at least one of the length and height of the point-of-purchase marketing display 450 in the expanded (e.g., unfolded or unbunched) configuration is such that the display 450 will not fit within the product packaging for shipment in the expanded configuration.

In use, a user, such as a store employee, can adjust the playard 400 from the collapsed (e.g., folded, stored) configuration to the expanded (e.g., unfolded, use) configuration. The user can then couple the bassinet 156, which includes the display 450 coupled to an end panel 168 or side panel 170, to the upper rail support members 122 or to another portion of the playard 400. The display 450 will then be draped over the upper rail support 122 by the user and positioned in front of (i.e., outside of) the side wall panel portion 112A, 112B, 112C, or 112D, for example. The display 450 can be removed from the playard 400 in the opposite manner.

In yet another example embodiment, a point-of-purchase marketing display can be constructed of cardboard or another material. The point-of-purchase marketing display can include one or more fold lines that extend either vertically along the entire height of the display or horizontally along the entire length of the display. The fold lines allow for the point-of-purchase marketing display to be folded up and take up less space during shipment to the store or other retail establishment. Once the playard is placed into the expanded (e.g., unfolded, use) configuration, the point-of-purchase marketing display can be unfolded and either attached to the playard (e.g. to one of the side panel portions 112 in substantially the same manner as described in FIGS. 2 and 3) or the bassinet 156 (e.g., in substantially the same way as described in FIG. 4) or the unfolded point-of-purchase marketing display can be placed inside of the playard and rest along the bottom surface of the playard and can be viewable through the mesh or netting of one or more of the side panel portions 112 of the playard. As with the other example embodiments described above, the point-of-purchase marketing display of this example can be an advertisement for the playard to which it can be attached. The display can include information about the playard, the manufacturer or branding entity of the playard the features of the playard, can show the playard in different modes of use, and can provide the pricing or any discount or rebate information related to the playard. The display is configured to be attached or attachable to the playard by attaching the bassinet to the playard in the manner described above, when the playard is in the use or unfolded configuration at a store selling the playard. This allows potential purchasers to learn more about the playard while contemplating a purchase.

Though the disclosed examples include particular arrangements of a number of parts, components, features, and aspects, the disclosure is not limited to only those examples or arrangements shown. Any one or more of the parts, components, features, and aspects of the disclosure can be employed alone or in other arrangements of any two or more of the same.

Although certain playard and other children's product features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

In example 1 of the disclosure there may be a playard that includes a bottom panel and a perimeter wall surrounding the bottom panel. In example 2 of the disclosure, the perimeter wall of the playard of example 1 can include a plurality of side panel portions. In example 3 of the disclosure, the playard of any one of examples 1-2 can be such that the bottom panel and the plurality of side panel portions define a child containment enclosure. In example 4 of the disclosure, the playard of any one of examples 1-3 can also include a point-of-purchase marketing display panel fixedly coupled to the child containment enclosure. In example 5 of the disclosure, the playard of any one of examples 1-4 can further include that the playard is configured to be adjusted from a collapsed configuration for storage or shipping of the playard to an expanded configuration for use of the playard. In example 6 of the disclosure, the playard of any one of examples 1-5 can further include wherein the point-of-purchase marketing display is configured to adjust from a second collapsed configuration to a second expanded configuration when the playard is adjusted to the expanded configuration. In example 7 of the disclosure, the playard of any one of examples 1-6 a point-of-purchase marketing display that includes a base panel and a plurality of textual information presented on the base panel, the textual information including information about the playard. In example 8 of the disclosure, the playard of any one of examples 1-7 can include the base panel being constructed of a wrinkle-free or wrinkle-resistant material. In example 9 of the disclosure, the playard of any one of examples 1-8 can include the base panel defining at least a portion of one of the plurality of side panel portions of the child containment enclosure. In example 10 of the disclosure, the playard of any one of examples 1-9 can include the base panel having a length and a height, wherein the length of the base panel is at least 75% of a length of the side panel portion. In example 11 of the disclosure, the playard of any one of examples 1-10 can include the base panel having a length and a height, wherein the length of the base panel is substantially equal to a length of the side panel portion. In example 12 of the disclosure, the playard of any one of examples 1-11 can include the height of the base panel being substantially equal to a height of the side panel portion. In example 13 of the disclosure, the playard of any one of examples 1-12 can be configured to be inserted into product packaging in the collapsed configuration and wherein in the second expanded configuration the point-of-purchase marketing display comprises a length dimension and a height dimension, wherein at least one of the length and the height dimension is greater than a corresponding dimension of the product packaging and does not fit into the product packaging in the second expanded configuration. In example 14 of the disclosure, the playard of any one of examples 1-13 can include the point-of-purchase marketing display panel being sewn to the child containment enclosure. In example 15 of the disclosure, the playard of any one of examples 1-14 can include each of the plurality of side panel portions having an inner-facing surface and an outer-facing surface. In example 16 of the disclosure, the playard of any one of examples 1-15 can include a first one of the plurality of side panel portions having a see-through material configured to provide a view into the child containment enclosure from outside of the playard. In example 17 of the disclosure, the playard of any one of examples 1-16 can include the point-of-purchase marketing display being fixedly coupled to the inner-facing surface of the first side panel portion and being viewable through the see-through material of the first side panel portion.

In example 18 of the disclosure there may be a playard that includes a bottom panel and a perimeter wall surrounding the bottom panel. In example 19 of the disclosure, the perimeter wall of the playard of example 18 can include a plurality of side panel portions. In example 20 of the disclosure, the playard of any one of examples 18-19 can be such that the bottom panel and the plurality of side panel portions define a child containment enclosure and include soft goods. In example 21 of the disclosure, the playard of any one of examples 18-20 can include one of the plurality of side panel portions having a point-of-purchase marketing display fixedly coupled to the perimeter wall. In example 22 of the disclosure, the playard of any one of examples 18-21 can include the one of the plurality of side panel portions having a first portion and a second portion, wherein the first portion is opaque and the second portion having a see-through material. In example 23 of the disclosure, the playard of any one of examples 18-22 can include the point-of-purchase marketing display being printed on the see-through material. In example 24 of the disclosure, the playard of any one of examples 18-23 can include the see-through material being a mesh material. In example 25 of the disclosure, the playard of any one of examples 18-24 can include the playard being configured to be adjusted from a collapsed configuration for storage or shipping of the playard to an expanded configuration for use of the playard. In example 26 of the disclosure, the playard of any one of examples 18-25 can include the point-of-purchase marketing display being configured to automatically and simultaneously adjust from a second collapsed configuration to a second expanded configuration when the playard is adjusted to the expanded configuration. In example 27 of the disclosure, the playard of any one of examples 18-26 can include the point-of-purchase marketing display having a base panel constructed of a wrinkle-free or wrinkle-resistant soft goods material and a plurality of textual information printed on at least one side of the base panel, the textual information including marketing information about the playard. In example 28 of the disclosure, the playard of any one of examples 18-27 can include the point-of-purchase marketing display being fixedly coupled by being sewn to at least one of the bottom panel and the perimeter wall of the playard.

In example 29 of the disclosure there may be a children's product. In example 30, the children's product of example 29 can be configured to be adjusted between a folded or collapsed configuration for storage and an unfolded or expanded configuration for use. In example 31, the children's product of any one of examples 29-30 can include a child containment apparatus. In example 32, the child containment apparatus of any one of examples 29-31 can include a child support portion for supporting a child in the unfolded or expanded configuration. In example 33, the child containment apparatus of any one of examples 29-32 can include at least one soft goods panel. In example 34, the child containment apparatus of any one of examples 29-33 can include a point of purchase marketing display fixedly coupled to the child containment apparatus. In example 35, the children's product of any one of examples 29-34 can be one of a stroller, a playard, or another child containment system. In example 36, the children's product of any one of examples 29-35 can include the point of purchase marketing display having a base panel constructed of a wrinkle-free or wrinkle-resistant soft goods material and a plurality of textual information printed on the base panel, the textual information including marketing information about the children's product.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A playard comprising:
   a bottom panel; and
   a perimeter wall surrounding the bottom panel the perimeter wall comprising a plurality of side panel portions, wherein the bottom panel and the plurality of side panel portions define a child containment enclosure; and
   wherein a point-of-purchase marketing display panel is integrally formed within at least a portion of a first side panel portion of the plurality of side panel portions.

2. The playard of claim 1, wherein the playard is configured to be adjusted from a collapsed configuration for storage or shipping of the playard to an expanded configuration for use of the playard, wherein the point-of-purchase marketing display is configured to adjust from a second collapsed configuration to a second expanded configuration when the playard is adjusted to the expanded configuration.

3. The playard of claim 2, wherein the playard is configured to be inserted into product packaging in the collapsed configuration and wherein in the second expanded configuration the point-of-purchase marketing display comprises a length dimension and a height dimension, wherein at least one of the length and the height dimension is greater than a corresponding dimension of the product packaging and does not fit into the product packaging in the second expanded configuration.

4. The playard of claim 1, wherein the point-of-purchase marketing display comprises:
   a base panel defining at least a portion of the first side panel portion; and
   a plurality of textual information presented on the base panel, the textual information including information about the playard.

5. The playard of claim 4, wherein the base panel is constructed of a wrinkle-free or wrinkle-resistant material.

6. The playard of claim 4, wherein the base panel has a length and a height, wherein the length of the base panel is at least 75% of a length of the first side panel portion.

7. The playard of claim 4, wherein the base panel has a length and a height, wherein the length of the base panel is substantially equal to a length of the first side panel portion.

8. The playard of claim 7, wherein the height of the base panel is substantially equal to a height of the first side panel portion.

9. The playard of claim 1, wherein the point-of-purchase marketing display panel is sewn to the child containment enclosure.

10. The playard of claim 1, wherein each of the plurality of side panel portions comprises an inner-facing surface and an outer-facing surface, wherein the first side panel portion comprises a see-through material configured to provide a view into the child containment enclosure from outside of the playard, wherein the point-of-purchase marketing display is provided on the outer-facing surface of the see-through material.

11. A playard comprising:
a bottom panel; and
a perimeter wall surrounding the bottom the perimeter wall comprising a plurality of side panels, wherein the bottom panel and the plurality of side panels define a child containment enclosure;
a point-of-purchase marketing display removably coupled to one of the plurality of side panels the point-of-purchase marketing display comprising:
a display panel;
a top elongated support member coupled to a top end of the display panel, the top elongated support member comprising a first end and a distal second end;
a bottom elongated support member coupled to a bottom end of the display panel, the bottom elongated support member comprising a first end and a distal second end;
a first attachment means disposed adjacent the first end of the top elongated support member;
a second attachment means disposed adjacent the second end of the top elongated support member;
a third attachment means disposed adjacent the first end of the bottom elongated support member;
a fourth attachment means disposed adjacent the second end of the bottom elongated support member;
where each of the first attachment means, second attachment means, third attachment means, and fourth attachment means is configured to be removably coupled to the one of the plurality of side panels.

12. The playard of claim 11, wherein the one of the plurality of side panels further comprises:
a fifth attachment means configured to be removably attached to the first attachment means;
a sixth attachment means configured to be removably attached to the second attachment means;
a seventh attachment means configured to be removably attached to the third attachment means; and
an eighth attachment means configured to be removably attached to the fourth attachment means.

13. The playard of claim 11, wherein the one of the plurality of side panels further comprises:
a fifth attachment means configured to be removably attached to the third attachment means;
a sixth attachment means configured to be removably attached to the fourth attachment means; and
an upper rail support member configured to support the first attachment means and the second attachment means.

14. The playard of claim 11, wherein each of the first attachment means, second attachment means, third attachment means, and fourth attachment means can be any one of a hook, loop tape, a button, a snap, a wire-tie, and a string; and
wherein each of the fifth attachment means, sixth attachment means, seventh attachment means, and eighth attachment means can be any one of at least one aperture through the one of the plurality of side panels, a snap, a button, a button loop, and a hook loop.

15. The playard of claim 11, wherein the point-of-purchase marketing display comprises:
a display panel; and
a plurality of textual information presented on the base panel, the textual information including information about the playard.

16. A children's product configured to be adjusted between a folded or collapsed configuration for storage and an unfolded or expanded configuration for use, the children's product comprising:
a child containment apparatus comprising:
a child support portion for supporting a child in the unfolded or expanded configuration;
at least one soft goods panel; and
a point-of-purchase marketing display sewn to the child containment apparatus.

17. The children's product of claim 16, wherein the children's product is one of a playard and a stroller.

18. The children's product of claim 16, wherein the point-of-purchase marketing display comprises:
a base panel constructed of a wrinkle-free or wrinkle-resistant soft goods material; and
a plurality of textual information printed on the base panel, the textual information including marketing information about the children's product.

* * * * *